(12) United States Patent
Kirwan et al.

(10) Patent No.: US 7,691,160 B2
(45) Date of Patent: Apr. 6, 2010

(54) FUEL REFORMER AND METHODS FOR USING THE SAME

(75) Inventors: John E. Kirwan, Troy, MI (US); Francois Ravenda, Longwy (FR)

(73) Assignee: Delphi Technologies, Inc., Troy, MI (US)

( * ) Notice: Subject to any disclaimer, the term of this patent is extended or adjusted under 35 U.S.C. 154(b) by 1175 days.

(21) Appl. No.: 11/282,232

(22) Filed: Nov. 17, 2005

(65) Prior Publication Data
US 2007/0107307 A1 May 17, 2007

(51) Int. Cl.
| | |
|---|---|
| B01J 7/00 | (2006.01) |
| B01J 10/00 | (2006.01) |
| B01J 8/02 | (2006.01) |
| B01J 35/02 | (2006.01) |
| H01M 8/06 | (2006.01) |
| C01B 3/36 | (2006.01) |
| C10J 3/46 | (2006.01) |
| C10J 3/54 | (2006.01) |

(52) U.S. Cl. .......................... 48/61; 48/197 R; 422/188; 422/211
(58) Field of Classification Search ...................... 48/61, 48/197 R; 422/188, 190, 193, 224
See application file for complete search history.

(56) References Cited
U.S. PATENT DOCUMENTS
2002/0054837 A1* 5/2002 Abe et al. .................... 422/174

| | | |
|---|---|---|
| 2003/0115799 A1 | 6/2003 | Docter et al. |
| 2004/0005268 A1* | 1/2004 | Bruck et al. .............. 423/437.2 |
| 2004/0019240 A1 | 1/2004 | Hibst et al. |
| 2004/0050037 A1 | 3/2004 | Betta et al. |
| 2004/0171900 A1* | 9/2004 | Wang et al. .................. 585/658 |

FOREIGN PATENT DOCUMENTS
| | | |
|---|---|---|
| EP | 1382383 | 1/2004 |
| FR | 2832996 | 6/2003 |
| WO | 2005/115616 | 12/2005 |

OTHER PUBLICATIONS

European Search Report dated Aug. 27, 2007.

* cited by examiner

*Primary Examiner*—Jennifer K Michener
*Assistant Examiner*—Matthew J Merkling
(74) *Attorney, Agent, or Firm*—Thomas N. Twomey

(57) ABSTRACT

In one embodiment, a fuel reformer can comprise: a mixing zone capable of mixing a fuel and an oxidant to form a fuel mixture and a reforming zone disposed downstream of the mixing zone. The reforming zone comprises a primary substrate and a secondary substrate. The primary substrate is disposed upstream of the secondary substrate and has a primary thermal mass that is greater than a secondary thermal mass of the secondary substrate. One embodiment of a method for operating a fuel reformer can comprise: mixing an oxidant and a fuel to form a fuel mixture, combusting the fuel mixture, heating the secondary substrate above its light-off temperature, changing an air to fuel ratio of the fuel mixture to a reforming mixture, producing an exotherm and a reformate at the secondary substrate, heating a primary substrate with the exotherm to above its light-off temperature, and producing a reformate.

8 Claims, 1 Drawing Sheet

FUEL REFORMER AND METHODS FOR USING THE SAME

BACKGROUND

Fuel reformers, or fuel processors, are capable of converting a hydrocarbon fuel such as methane, propane, natural gas, gasoline, diesel, and the like, into various lower molecular weight reformates such as hydrogen ($H_2$), carbon monoxide (CO), carbon dioxide ($CO_2$), methane ($CH_4$), nitrogen ($N_2$), and water ($H_2O$). Reformers can be produced in various configurations, such as, steam reformers, dry reformers, or partial oxidation reformers.

Steam reformers react fuel and steam ($H_2O$) in heated cylinders filled with catalytic media. Generally endothermic, heat is transferred into the cylinders, which promotes the conversion of hydrocarbons into primarily hydrogen and carbon monoxide. An example of the steam reforming reaction is as follows:

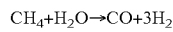

Dry reformers produce hydrogen and carbon monoxide in the absence of water, employing oxidants, such as carbon dioxide, in the presence of catalysts. Similar to steam reformers, dry reformers are also endothermic and adsorb heat in order to encourage conversion. An example of a dry reforming reaction is depicted in the following reaction:

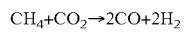

Partial oxidation reformers burn a fuel/oxidant mixture in the presence of catalysts to convert the reactants into reformate, such as, carbon monoxide and hydrogen. Partial oxidation reformers generally comprise a mixing zone 26 and a reforming zone to provide this function. In the mixing zone 26, the oxidant and a fuel are mixed to form a fuel mixture. In the reforming zone, the fuel mixture undergoes an exothermic reaction, generally within a catalytic substrate, which comprises catalysts capable of converting the reactants into the desired reformate. The process is exothermic and temperatures of about 600° C. to about 1,600° C. (degrees Celsius) can be experienced. An example of the partial oxidation reforming reaction is as follows:

$$CH_4 + \frac{1}{2}O_2 \rightarrow CO + 2H_2$$

Reformers may be used in multiple applications. One such application is an emissions abatement system for stoichiometic or lean-burn gasoline and diesel-powered vehicles, which can employ a partial oxidation reformer to convert liquid on board fuel (e.g., gasoline, diesel fuel, biodiesel, alcohol, oxygenated fuels) into reformate. Reformate can generally comprise hydrogen and carbon monoxide, which can be used to fuel the engine to produce low emissions, and/or fed to the exhaust aftertreatment system to enhance its performance. However, during start-up of the reformer when the catalytic substrate is below its normal light-off temperature, reformate is not produced, which results in higher emission production and/or less efficient exhaust aftertreatment.

Consequently, there is a need to further reduce start-up times and hopefully to reduce or eliminate the amount of undesirable emissions produced during reformer start-up. This is especially of concern as the emission requirements for passenger and freight vehicles are becoming increasingly more stringent.

BRIEF SUMMARY

Disclosed herein are fuel reformers and methods for operating the same. In one embodiment, a fuel reformer can comprise: a mixing zone capable of mixing a fuel and an oxidant to form a fuel mixture and a reforming zone disposed downstream of the mixing zone. The reforming zone comprises a primary substrate and a secondary substrate. The primary substrate is disposed upstream of the secondary substrate and has a primary thermal mass that is greater than a secondary thermal mass of the secondary substrate.

One embodiment of a method for operating a fuel reformer can comprise: mixing an oxidant and a fuel to form a fuel mixture, combusting the fuel mixture, heating the secondary substrate above its light-off temperature, changing an air to fuel ratio of the fuel mixture to a reforming mixture, producing an exotherm and a reformate at the secondary substrate, heating a primary substrate with the exotherm to above its light-off temperature, and producing a reformate in the primary substrate.

The above described and other features are exemplified by the following figure and detailed description.

BRIEF DESCRIPTION OF THE DRAWINGS

Refer now to the figure, which is meant to be exemplary, not limiting.

DETAILED DESCRIPTION

Figure 1:
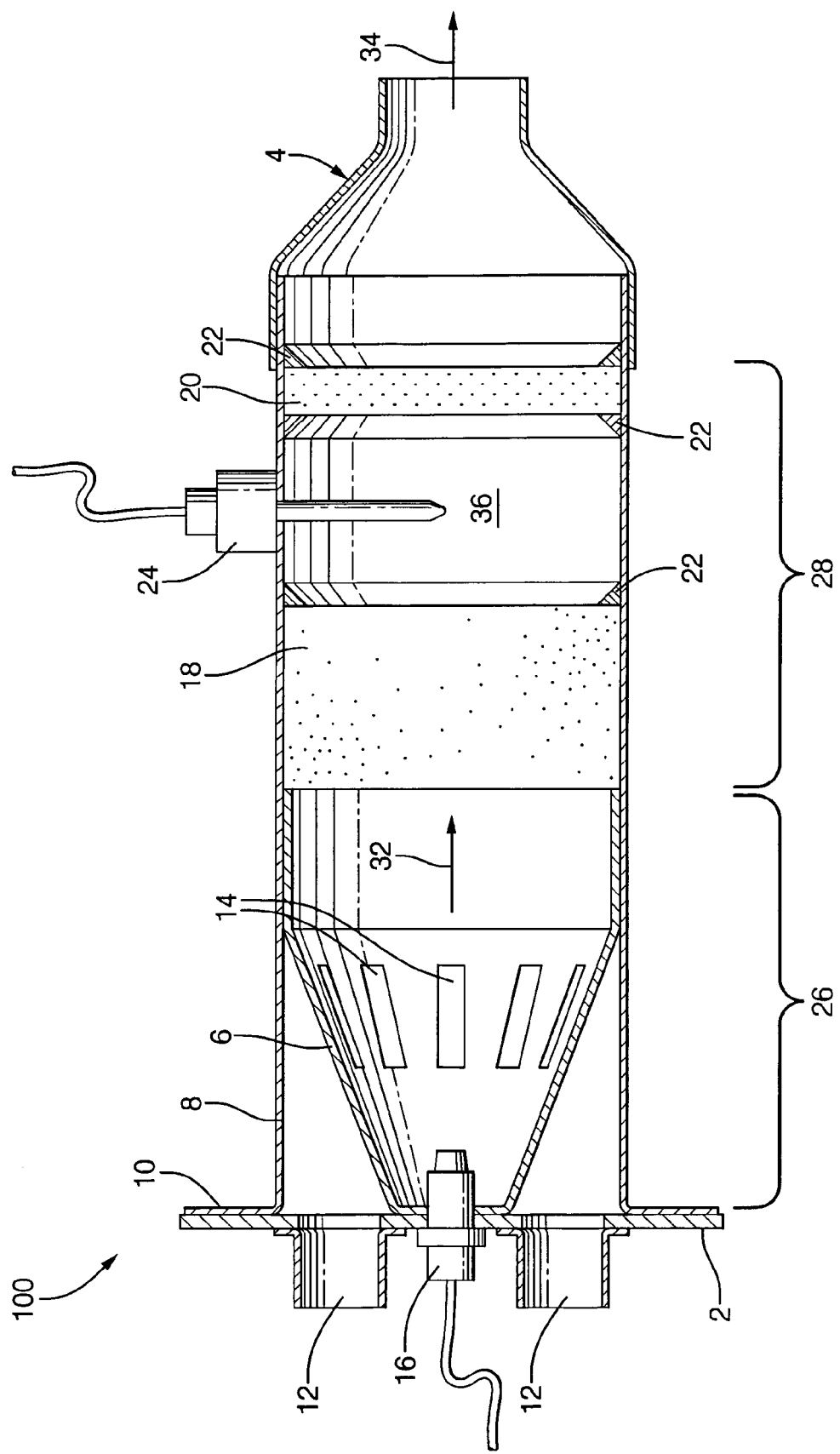
FIG. 1 is a cross-sectional illustration of an exemplary fuel reformer.

To minimize undesirable emissions during the start-up of a fuel reformer 100, a design is disclosed herein that incorporates multiple catalytic substrates. To be more specific, a fuel reformer 100 is disclosed that can employ a low thermal mass substrate and a higher thermal mass substrate. The low thermal mass substrate can reach operating temperature before a higher thermal mass substrate, thereby reducing the start-up time compared to reformer designs with a single high thermal mass substrate. In addition to the low thermal mass substrate, a higher thermal mass substrate is incorporated into the design that can assume most of the reformate conversion once it reaches operating temperature. This design reduces or eliminates the occurrence of high temperature excursions on the low thermal mass substrate, thereby prolonging the substrate's service life.

All ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc). The terms "first," "second," . . . , "primary", "secondary", . . . , and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the metal(s) includes one or more metals).

Referring now to FIG. 1, a partial and cross-sectional view of an exemplary fuel reformer is illustrated and generally designated 100 (hereinafter referred to as "reformer"). In the illustration four components can be assembled to form the basic housing of reformer 100; mounting plate 2, end-cone 4, mixing cone 6, and shell 8 (hereinafter referred to as housing components). In this exemplary embodiment it is envisioned that mixing cone 6 can be connected (e.g., bolted, or otherwise attached) to mounting plate 2. Shell 8 can be slip-fit over mixing cone 6, and end-cone 4 can be slip-fit over shell 8 and connected thereto (e.g. welded, or otherwise attached). Shell 8 can comprise flange 10, which can be connected (e.g. bolted, welded, or otherwise attached) to mounting plate 2. Also connected to mounting plate 2 can be oxidant (e.g., air) supply port(s) 12, which can supply the internal volume of mixing cone 6 with an oxidant through a plurality of oxidant (e.g., air) inlets 14. Fuel injector 16 can be connected to mounting plate 2 and project into mixing cone 6, where it is capable of injecting fuel into mixing cone 6.

Supported within shell 8 can be a primary substrate 18 and a secondary substrate 20. The secondary substrate 20 can be positioned between end-cone 4 and the primary substrate 18. The substrates 18, 20 can be secured using multiple internal retainers 22. Disposed between the primary substrate 18 and the secondary substrate 20 can be a combustion chamber 36. Connected to shell 8 and extending into the combustion chamber 36 can be an ignition source 24.

Reformer 100 can comprise "zones", which carry out various functions of the reformer. More specifically, reformer 100 can comprise a mixing zone 26 (which can comprise the internal volume of the mixing cone 6 up to about primary substrate 18) and a reforming zone 28 (which can comprise the internal volume from an upstream end of the primary substrate 18 through the secondary substrate 20).

End-cone 4 can comprise an outlet 30, which is in fluid communication with the secondary substrate 20, which is in fluid communication with primary substrate 18, which is in fluid communication with the internal volume of mixing cone 6, which is in fluid communication with air supply port 12 via air inlets 14. In other words, the components can be arranged, in the flow direction 34, as follows: mixing cone 6, primary substrate 18, combustion chamber 36, and secondary substrate 20, with the mounting plate 2 disposed upstream of the mixing cone 6 and the end-cone 4 disposed downstream of the secondary substrate 20.

Generally, reformer 100 can be cylindrical with a circular cross-sectional design. However these components may be configured in any geometry that is effective at producing reformate (e.g. elliptical, rectangular, and the like). The housing components (shell 8, mixing cone 6, end-cone 4, and mounting plate 2) can comprise any materials that are capable of withstanding the service conditions generally endured by the device, including: 1) temperature cycling between about −40 degrees Celsius (° C.) to about operating temperature (e.g. 1,600° C.), 2) housing an oxidative combustion reaction, and 3) enduring the external environmental conditions (e.g., sand, road salt, water, etc.). Applicable materials can be, but are not limited to, ferrous metals or ferritic stainless steels (e.g. martens tic, ferritic, austenitic stainless materials), nickel-based alloys, and the like. Furthermore, any method of assembly or attachment can be utilized to connect the housing components to one another, such as, but not limited to, welds, fasteners (e.g. bolts, rivets, screws, and the like), press-fits, clamps, and the like. It is also envisioned that a combination of the housing components can be fabricated of one continuous piece of metal (e.g. spin formed and the like).

Air supply port 12 is illustrated as being disposed on mounting plate 2. It is to be apparent however that air supply port 12 can be disposed in any orientation and in any configuration that can supply an oxidant to the internal volume of mixing cone 6. For example, air supply port 12 can be positioned in the wall of shell 8. Furthermore, one or more air supply ports 12 can be positioned in any configuration or orientation based on the design and specific application of the reformer 100. For example, it may be desirable to configure the air supply ports such that the air passes through a heat exchanger to preheat the airflow using the hot reformate produced by the reformer. In some applications, an air supply port 12 can comprise a valve capable of metering the amount of air supplied to the reformer 100 (e.g., for enhanced fuel mixture control).

Air inlets 14 can comprise any shape, geometry, number, and orientation that can supply air from air supply port 12 to the internal volume of mixing cone 6. Air inlets 14 can be disposed about mixing cone 6 in a configuration that aids the dispersion of fuel within the air. In addition, air inlets 14 can comprise flow directors that can extend into the internal volume of the mixing cone 6 and modify the airflow therein (e.g. create a vortex, flow eddies, turbulence, and the like). Further, mixing cone 6 need not be cone-shaped. For example, mixing cone 6 can comprise a cylinder that can be concentrically disposed within shell 8, which can comprise air inlets 14 about its' outer surface. Even further, air inlets 14 can be disposed directly in mounting plate 2.

Oxidants supplied to the reformer 100 can comprise, air, pure oxygen, recirculated exhaust gas, and the like, as well as combinations comprising at least one of the foregoing. The oxidant supplied to reformer 100 can be heated prior to mixing with the fuel. Any methods may be employed, such as, but not limited to, passing air supply through a heat exchanger, utilizing electrical heating elements, and the like. In addition, a pump, compressor, turbine, fan, or the like can be utilized to pressurize the oxidant, fuel, and/or the fuel mixture 32 if desired, and sensors such as flow sensors, temperature sensors, pressure sensors, and the like may be employed to adjust, monitor, and/or control the air and/or fuel supplied to the reformer to maximize efficiency.

In the reformer 100, the oxidant (e.g., air) is mixed with another reactant (e.g., fuel). Reformer 100 can operate using various reactants to produce various reformate compositions. Diesel fuel and gasoline can be used in many applications, as it is readily available on-board vehicles. However, other hydrocarbon-based fuels can be converted as well, such as, ethanol, methanol, kerosene, diesel blends, and the like; gaseous fuels, such as natural gas, propane, butane, naphtha's, and the like; and alternative fuels, such as hydrogen, biofuels, dimethyl ether, ethanol, and the like; as well as combinations comprising at least one of the foregoing fuels.

Primary substrate 18 and secondary substrate 20 can comprise, materials such as, but not limited to, cordierite, silicon carbide, mullite, titanium oxides, titanium phosphates, aluminum oxides (alpha-aluminum oxides), aluminates (lanthanum aluminate, lanthanum hexaaluminate, zirconia toughened aluminate (ZTA)), alumino silicates, aluminum phosphates, aluminum titanates, zirconium oxides, zirconium phosphates, lanthanum zirconate, magnesium silicates, stabilized versions of the preceding, and combinations comprising at least one of the foregoing. Disposed on and/or in the substrate can be a reforming catalyst comprising a metal(s), such as, but not limited to, platinum, iridium, cerium, ruthenium, rhodium, cobalt, iron, osmium, palladium, tantalum, zirconium, yttrium ceria, nickel manganese, copper, and the like, as well as oxides, salts, or alloys as well as combinations comprising at least one of the foregoing.

The primary substrate 18 is generally higher in thermal mass than the secondary substrate 20. This enables the secondary substrate 20 to reach its light-off temperature faster than the primary substrate 18. Hence, the specific composition of the secondary substrate 20, as well as any catalyst(s) disposed thereon, can be chosen to enhance the rate at which the secondary substrate 20 attains its light-off temperature. More specifically, the thermal mass of the primary substrate 18 can be equal to or greater than about 3 times that of the secondary substrate 20, or even more specifically equal to or greater than about 5 times greater than that of the secondary substrate 20, and even yet more specifically, equal to or greater than about 10 times greater than that of the secondary substrate 20. However, it is to be apparent that the size and mass of the various substrates depend on the specific application and parameters such as vehicle size and reformer flow rates. For example, in the embodiment shown in FIG. 1, the primary substrate 18 can comprise a thermal mass that is 10 times greater than the thermal mass of the secondary substrate 20 (e.g., a thermal mass of the secondary substrate can be 10 units, while that of the primary substrate can be 100 units). As a result, combustion of the fuel mixture 32 within the combustion chamber 36 can raise the temperature of the secondary substrate 20 to the light-off temperature prior to the primary substrate 18 reaching the light-off temperature. Then, exotherms from the secondary substrate 20 can facilitate light-off of the primary substrate 18.

The substrates, primary and secondary, can be secured within the shell 8 by various methods. Some possible methods include retainers (e.g. rings, springs, clips, pins, rods, anchors), fasteners (e.g. bolts, pins, rivets, adhesives, sealant), surface features (e.g. ribs, lips, steps, bumps, peens), matting (e.g. intumescent matting, non-intumescent mating, packing material), adhesion agent(s), and the like, as well as combinations comprising at least one of the foregoing.

Operation of the reformer comprises two modes. The first mode of operation is start-up. During start-up, fuel injector 16 can inject fuel into mixing zone 26 where it can mix with air flowing through air inlets 14 to form fuel mixture 32. The fuel mixture 32 is generally maintained at about stoichiometric conditions (e.g. air to fuel ratio of about 17:1), with allowances for combustion optimization and enrichment to account for unvaporized fuel). Next, fuel mixture 32 flows through primary substrate 18 and is ignited by ignition source 24 within combustion chamber 36. During start-up, the combustion reaction of fuel mixture 32 is generally contained within the combustion chamber 36. The combustion reaction raises the temperature of the secondary substrate 20 to its light-off temperature such that exothermic reforming can be sustained. Because primary substrate 18 comprises the upstream boundary of the combustion chamber, combustion may also raise the temperature of the downstream portion of the primary substrate 18.

Once the secondary substrate 20 attains light-off temperature, the combustion reaction is stopped and the air to fuel ratio of the fuel mixture 32 is adjusted to a reforming mixture (e.g. air to fuel ratio of about 5:1). The preheated secondary catalyst 20 reacts the reforming mixture to produce reformate 34. This exothermic reformate production reaction also heats the primary substrate 18 (e.g., the downstream end of the primary substrate 18 increases in temperature by thermal radiation). Once at least a portion of the primary substrate 18 reaches its light-off temperature (e.g., about 250° C. to about 300° C.), the reforming reaction advances into the primary substrate 18, which thereafter converts a majority of the fuel mixture 32 to reformate.

Not to be limited by theory, the use of a primary and a secondary substrate 20 reduces reformer start-up time due to a reduction in the time to attain light-off temperature. The low thermal mass of the secondary substrate 20 allows it to reach operating temperature before the primary substrate 18 (e.g., up to or greater than about 30, or even up to or greater than about 60 seconds faster). However, low thermal mass substrates are susceptible to high temperature excursions (e.g., exceeding about 1,100° C. to about 1,300° C.) due to variations in operating conditions such as a lean fuel mixture 32 or increased flow rate through the reformer. The detrimental effect of the high temperature excursions on the low thermal mass substrate is much greater than on a higher thermal mass substrate, due to its lack of resilience. As a result, if only a low thermal mass substrate were employed, light-off temperatures could be quickly attained, but the substrate would rapidly degrade from the thermal conditions caused by continuous reforming reactions on the substrate surface. However, because of the greater thermal mass of the primary substrate 18, temperature fluctuations caused by air to fuel excursions are reduced, which provide increased service life of the secondary substrate 20.

To further control reformer 100's operation, it is envisioned that a system controller (not shown) can be employed. The system controller can be any device capable of these functions, such as, but is not limited to, a processor(s), computer(s), and so forth, and can employ memory, storage, register(s), timing, interrupt(s), communication interfaces(s), input/output signal interface(s), and so forth, as well as combinations comprising at least one of the foregoing. Furthermore, the system controller can include input signal processing and filtering capabilities that enable accurate sampling and conversion of acquisitions of such signals from various sensor(s). For example, an "on/off" controller, proportional controller, and/or a proportional-integral-derivative controller (e.g. with advanced "fuzzy-logic" capabilities), and the like can be employed.

In addition to the system controller, sensor(s) and other equipment can be employed in operable communication with the system controller enabling its function, such as thermocouple(s), probe(s), transducer(s), cell(s), meter(s), switche (s), and so forth, as well as combinations comprising at least one of the foregoing. This equipment can assist in controlling operating variable(s), component(s), and condition(s) of reformer 100, such as the fuel mixture 32, the oxidant flow rate, the temperature, the fuel pump speed, the injector pump pressure, the injector pump pulse width, and so forth, as well as combinations comprising at least one of the foregoing.

The devices described herein can also employ auxiliary heating device(s) that can be employed to decrease the time required for the substrate(s) to reach light-off temperature by supplying heat to the substrate(s). For example, the substrates can be heated prior to and after ignition utilizing electrical heating element(s) (e.g., a cartridge-type resistive heating elements that can be disposed within the primary substrate 18 and controlled by the system controller). In another embodiment, a band-type resistive heater can be assembled to the reformer's shell 8 that is capable of heating the primary substrate 18. In addition, heat retention media and/or insulation can be employed (e.g., which can be disposed around the reformer 100) to minimize temperature loss between successive start-ups. The operation of an electrical resistive heating element can comprise initial preheating prior to ignition, heating during start-up, and heating until the light-off temperature of the substrate has been achieved. After light-off temperature, the heating element can be shut down.

Disclosed herein is a fuel-reforming device and methods of its operation, which enables a reduction in start-up emissions by reducing the start-up time of a fuel reformer. The reformer employs multiple catalytic substrates to reduce light-off time. This is achieved by employing substrates comprising different thermal mass, wherein the downstream substrate has a lower thermal mass then a the upstream substrate. In this configuration, after ignition of the fuel mixture, the low thermal mass substrate rapidly reaches its light-off temperature. For example, attains light-off in greater than or equal to about 30 seconds, or even greater than or equal to about 60 seconds faster than a reformer configured without a low-thermal mass secondary substrate. Furthermore, once the primary substrate reaches its light-off temperature and assumes reformate production, the primary substrate is capable of reducing temperature excursions that would otherwise be experienced by the low thermal mass substrate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or element to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel reformer comprising:
   a mixing zone capable of mixing a fuel and an oxidant to form a fuel mixture;
   a reforming zone disposed downstream of the mixing zone, wherein the reforming zone comprises a primary substrate and a secondary substrate, wherein the primary substrate and the secondary substrate comprise a reforming catalyst, wherein the primary substrate has a primary thermal mass that is greater than a secondary thermal mass of the secondary substrate, and wherein the secondary substrate is located downstream of the primary substrate;
   a combustion chamber disposed between the primary substrate and the secondary substrate; and
   an ignition source disposed in the combustion chamber.

2. The fuel reformer of claim 1, wherein the primary thermal mass is greater than or equal to about three times the secondary thermal mass.

3. The fuel reformer of claim 2, wherein the primary thermal mass is greater than or equal to about five times the secondary thermal mass.

4. The fuel reformer of claim 1, wherein the primary thermal mass is greater than or equal to about ten times the secondary thermal mass.

5. The fuel reformer of claim 1, further comprising a fuel injector and an oxidant inlet both connected in operable communication to the mixing zone.

6. The fuel reformer of claim 1, further comprising an auxiliary heating device disposed in thermal communication with the primary substrate.

7. The fuel reformer of claim 1, further comprising an auxiliary heating device disposed in thermal communication with the secondary substrate.

8. A method for operating a fuel reformer, comprising:
   mixing an oxidant and a fuel to form a fuel mixture; combusting the fuel mixture;
   heating a secondary substrate above a light-off temperature of the secondary substrate; changing an air to fuel ratio of the fuel mixture to a reforming mixture; producing an exotherm and a reformate at the secondary substrate; heating a primary substrate with the exotherm to above a light-off temperature of the primary substrate; and producing a reformate in the primary substrate; wherein the primary substrate and the secondary substrate comprise a reforming catalyst, wherein the primary substrate comprises a primary thermal mass that is greater than a secondary thermal mass of the secondary substrate,
   wherein the secondary substrate is located downstream of the primary substrate, and wherein combusting the fuel further comprises igniting the fuel mixture in a combustion chamber disposed between the primary substrate and the secondary substrate.

* * * * *